US008363872B2

(12) United States Patent
Wiggins et al.

(10) Patent No.: US 8,363,872 B2
(45) Date of Patent: Jan. 29, 2013

(54) MAGNETIC EARPIECE COUPLING

(76) Inventors: Dan Wiggins, Edmonds, WA (US); Donald L Bowie, Burien, WA (US)

( * ) Notice: Subject to any disclaimer, the term of this patent is extended or adjusted under 35 U.S.C. 154(b) by 196 days.

(21) Appl. No.: 12/760,423

(22) Filed: Apr. 14, 2010

(65) Prior Publication Data

US 2010/0290657 A1 Nov. 18, 2010

Related U.S. Application Data

(60) Provisional application No. 61/169,209, filed on Apr. 14, 2009.

(51) Int. Cl.
*H04R 25/02* (2006.01)
*H04B 5/02* (2006.01)
*H04R 25/00* (2006.01)
*H04B 5/00* (2006.01)

(52) U.S. Cl. ........ 381/328; 381/331; 381/323; 381/315; 455/41.1

(58) Field of Classification Search .................. 381/328, 381/331, 323, 314, 315, 312, 322, 324, 380, 381/23.1; 455/41.1
See application file for complete search history.

(56) References Cited

U.S. PATENT DOCUMENTS

| | | | | |
|---|---|---|---|---|
| 2,017,358 | A * | 10/1935 | Taylor | 381/319 |
| 3,668,321 | A * | 6/1972 | Lang | 381/124 |
| 4,025,721 | A * | 5/1977 | Graupe et al. | 704/227 |
| 4,548,082 | A * | 10/1985 | Engebretson et al. | 73/585 |
| 5,615,229 | A * | 3/1997 | Sharma et al. | 375/259 |
| 6,157,728 | A * | 12/2000 | Tong et al. | 381/331 |
| 6,208,740 | B1 * | 3/2001 | Grever | 381/79 |
| 6,658,124 | B1 * | 12/2003 | Meadows | 381/323 |
| 6,694,034 | B2 * | 2/2004 | Julstrom et al. | 381/315 |
| 7,181,032 | B2 * | 2/2007 | Jakob et al. | 381/314 |
| 7,254,246 | B2 * | 8/2007 | Jakob | 381/315 |
| 7,397,926 | B1 * | 7/2008 | Frerking | 381/315 |
| 7,426,279 | B2 * | 9/2008 | Cochran et al. | 381/331 |
| 7,599,500 | B1 * | 10/2009 | Segel et al. | 381/60 |
| 7,599,508 | B1 * | 10/2009 | Lynch et al. | 381/330 |
| 7,620,195 | B2 * | 11/2009 | Bengtsson et al. | 381/323 |
| 7,634,098 | B2 * | 12/2009 | Townsend et al. | 381/321 |
| 7,889,879 | B2 * | 2/2011 | Dillon et al. | 381/314 |
| 2006/0039577 | A1 * | 2/2006 | Sanguino et al. | 381/315 |
| 2006/0147069 | A1 * | 7/2006 | Svajda et al. | 381/316 |
| 2006/0280324 | A1 * | 12/2006 | Beck et al. | 381/312 |
| 2007/0269065 | A1 * | 11/2007 | Kilsgaard | 381/315 |
| 2008/0095387 | A1 * | 4/2008 | Niederdrank et al. | 381/314 |
| 2008/0137889 | A1 * | 6/2008 | Rass | 381/314 |
| 2008/0175421 | A1 * | 7/2008 | Chizari | 381/315 |
| 2008/0205678 | A1 * | 8/2008 | Boguslavskij et al. | 381/312 |
| 2008/0317274 | A1 * | 12/2008 | Kim | 381/370 |
| 2009/0010465 | A1 * | 1/2009 | Boguslavskij et al. | 381/315 |
| 2009/0052707 | A1 * | 2/2009 | Hain | 381/315 |
| 2009/0067653 | A1 * | 3/2009 | Meskens et al. | 381/315 |
| 2009/0110221 | A1 * | 4/2009 | Rithinger | 381/312 |
| 2009/0238395 | A1 * | 9/2009 | Jubelirer et al. | 381/370 |
| 2009/0245549 | A1 * | 10/2009 | Jubelirer et al. | 381/309 |
| 2009/0285426 | A1 * | 11/2009 | Boguslavskij | 381/323 |
| 2009/0296967 | A1 * | 12/2009 | Mullenborn et al. | 381/315 |
| 2010/0142738 | A1 * | 6/2010 | Zhang et al. | 381/315 |
| 2011/0286616 | A1 * | 11/2011 | Beck et al. | 381/315 |
| 2011/0311084 | A1 * | 12/2011 | Drader | 381/315 |

* cited by examiner

*Primary Examiner* — Edgardo San Martin
(74) *Attorney, Agent, or Firm* — Æ on Law; Adam L. K. Philipp

(57) ABSTRACT

A magnetized hearing-aid earpiece inductive coupling system includes a hearing-aid earpiece including a magnetized assembly with an inductive coil. The earpiece also includes an earpiece controller that is communicatively coupled with the inductive coil and that controls adjustable settings of the earpiece. A hearing-aid programming device includes a magnetized coupler with a second inductive coil. The magnetized assembly and the magnetized coupler are configured to magnetically hold the two inductive coils in proximity to one another, such that the inductive coils inductively communicatively couple the earpiece controller with the hearing-aid programming device. The hearing-aid programming device is thereby enabled to instruct the earpiece controller to adjust the earpiece's adjustable settings.

8 Claims, 4 Drawing Sheets

MAGNETIC EARPIECE COUPLING

FIELD

This disclosure relates generally to earpieces, and more specifically, to systems and methods of earpiece coupling.

BACKGROUND

Before the invention of modern electronics, hearing loss was mitigated with passive funnel-like amplification cones known as ear trumpets or ear horns. Today, many hearing aids are electro-acoustic devices that are designed to actively amplify and modulate sounds for a wearer. For example, a hearing aid may simply amplify all received sound or may selectively amplify certain frequencies of sound.

Hearing aids can be various shapes and sizes and may be present in various configurations can include portions that are held in and around the ear. Some hearing aids are designed to reside within the ear canal or even be anchored to bone. Regardless of configuration, hearing aids typically comprise a microphone, a speaker (receiver), a battery, and electronic circuitry. Audio processing may be digital or analog and control circuitry may be adjustable or programmable.

Examples of such devices include U.S. Pat. No. 2,017,358, entitled “Hearing Aid Apparatus and Amplifier”; U.S. Pat. No. 4,025,721 entitled “Method of and means for adaptively filtering near-stationary noise from speech”; and U.S. Pat. No. 4,548,082, entitled “Hearing aids, signal supplying apparatus, systems for compensating hearing deficiencies, and methods”

Because users prefer unobtrusive devices, hearing aids are typically small units, which likewise have tiny controls and coupling points. Unfortunately, this makes adjustment and programming of these devices difficult. For example, some hearing aids have small physical adjustment or programming interfaces such as knobs or switches. These interfaces are difficult to use because of their small size, which is especially problematic for users with disabilities or advanced age.

Some hearing aids can be programmed by a connection to a computer or other device, which is typically achieved via a wire. Such programming systems are also deficient because many users will have difficulty connecting such a device to their hearing aid because the connection points are so small. Moreover, such physical connections are dangerous because programming occurs while the hearing aid is being worn, and users can accidently pull a hearing aid out of their ear while it is attached coupled to a wire, or even damage the wire or wire coupling if the wire is pulled.

To remedy the problems associated with wired connections, some hearing aids are operable to be programmed wirelessly. However, hearing aids that are capable of wireless communication are typically heavier and bulkier than hearing aids that utilize wired connections. Additionally, wireless-enabled hearing aids also tend to be more expensive than other types of hearing aids. Lastly, wireless-enabled hearing aids consume battery power at a higher rate, meaning the frequency of battery replacement is increased, and the usable continuous time of the hearing aid is reduced.

Regardless of how an earpiece is programmed, a user is typically not able to program a hearing aid themselves because of the deficiencies discussed above relating to wire coupling or manipulation of small controls. Moreover, many hearing aids are not even designed to be programmed by a user because of these very issues. Accordingly, an audiologist is usually required to program hearing aids along with associated direct or indirect labor costs. Naturally, having to engage an audiologist in hearing aid programming is cumbersome for users, and makes it difficult to address hearing aid issues immediately. For example, audiologists have limited working hours and availability and are therefore unable to adjust a user’s hearing aid during non-business hours or may not have open appointments that suit a user’s schedule.

BRIEF DESCRIPTION OF THE DRAWINGS

The present invention will be described by way of exemplary embodiments but not limitations, illustrated in the accompanying drawings in which like references denote similar elements, and in which.

DESCRIPTION

Illustrative embodiments presented herein include, but are not limited to, systems and methods for earpiece coupling Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the embodiments described herein; however, the order of description should not be construed as to imply that these operations and/or communications are necessarily order dependent. In particular, these operations and/or communications need not be performed in the order of presentation.

The phrase “in one embodiment” is used repeatedly. The phrase generally does not refer to the same embodiment; however, it may. The terms “comprising,” “having” and “including” are synonymous, unless the context dictates otherwise.

The present disclosure relates to various embodiments of a magnetic earpiece coupling system that is easy to use and may be operable to transmit power and programming instructions to one or more earpiece. Data and or power may be transmitted via an inductive connection. Additionally, various embodiments relate to a magnetic earpiece coupling system that protects the earpiece and coupling system from damage and provides selective coupling for right and left oriented earpieces.

Figure 1:
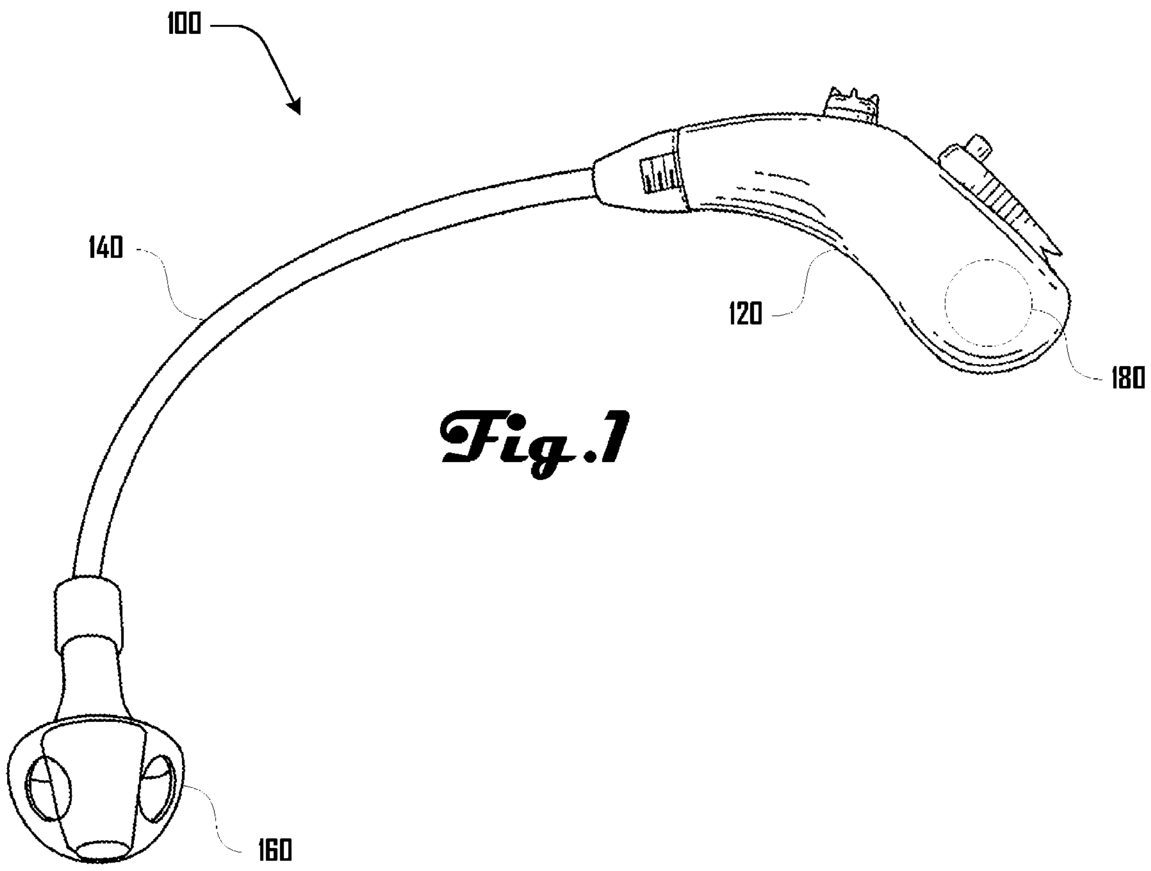
FIG. 1 is a depiction of an earpiece in accordance with various embodiments.

FIG. 1 is a depiction of an exemplary earpiece 100 in accordance with various embodiments. The earpiece 100 comprises an earpiece body 120, a tube 140, and an ear bud 160. The earpiece body 120 further comprises a magnetized assembly 180.

In some embodiments, the earpiece 100 may be various types of audio devices, which may include a hearing aid, an audio amplification device, an in-ear monitor, ear-phones, and the like. FIG. 1 depicts an earpiece having a tube 140 that conveys sound from the earpiece body 120 to the ear bud 160; however, in further embodiments, an earpiece 100 may take on various shapes and configurations. Accordingly, the earpiece 100 may or may not comprise a tube 140 or ear bud 160 in some embodiments. In some embodiments, a hearing aid may be a body worn aid, a behind the ear aid ("BTE"), in ear aid ("ITE"), receiver in the ear aid ("RITE"), in the canal aid ("ITC"), mini canal aid ("MIC"), completely in the canal aid ("CIC"), open-fit aid, over the ear aid ("OTE"), bone anchored hearing aid ("BAHA"), and the like.

Figure 2:
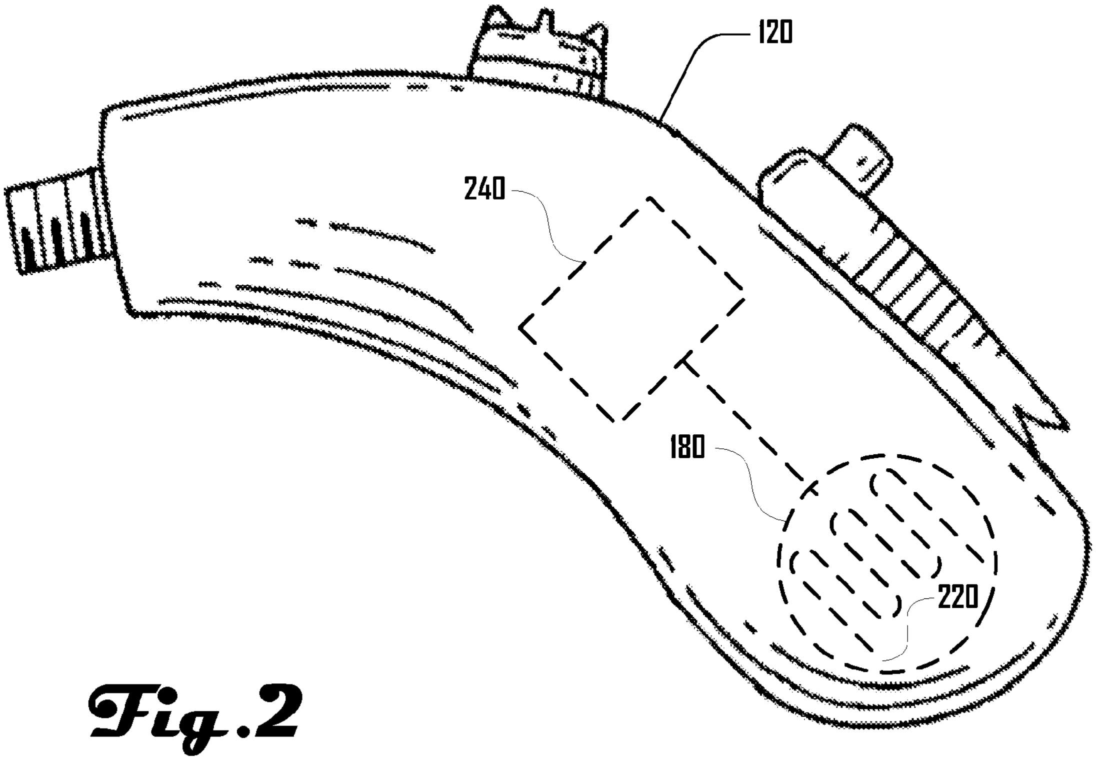
FIG. 2 is a close-up view of an earpiece body in accordance with various embodiments.

FIG. 2 is a close-up view of an earpiece body 120 in accordance with various embodiments, which comprises a magnetized assembly 180 that is operably connected to an earpiece controller 240. In various embodiments, the magnetized assembly 180 may be operable to form an inductive data connection, and may comprise a coil 220, which facilitates such an inductive connection.

In some embodiments, the earpiece controller 240 may be operable to control various aspects of an earpiece 120, which may include frequency response, volume, audio effects, audio source, audio bit-rate, and the like. The earpiece controller 240 may be operably connected to or comprise various components of an earpiece 120 such as a speaker, memory, database, and the like (not shown).

Figure 3A:
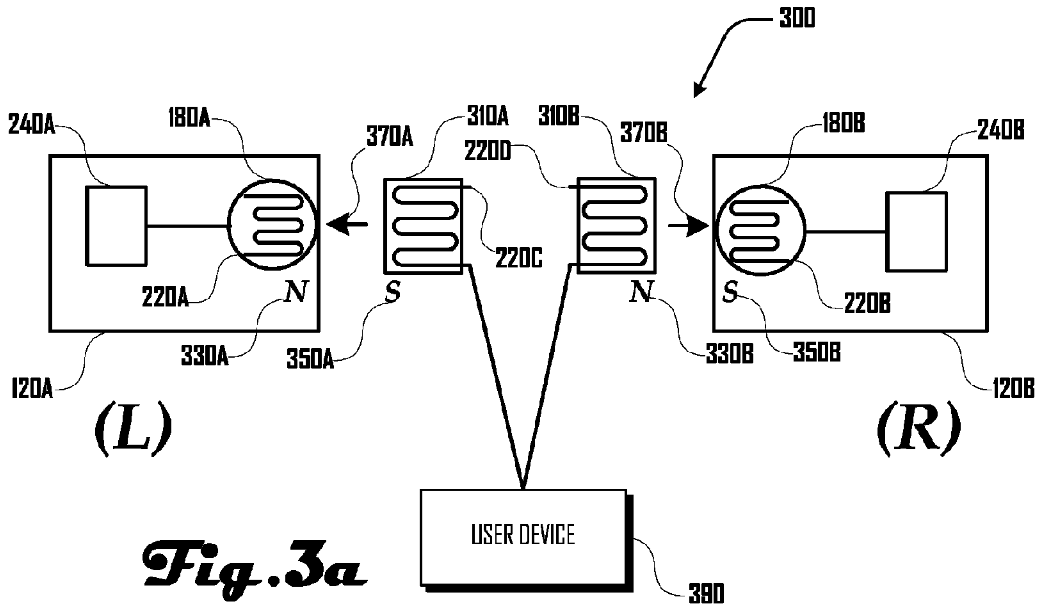
FIG. 3*a* is an earpiece coupling system in accordance with an embodiment.
Figure 3B:
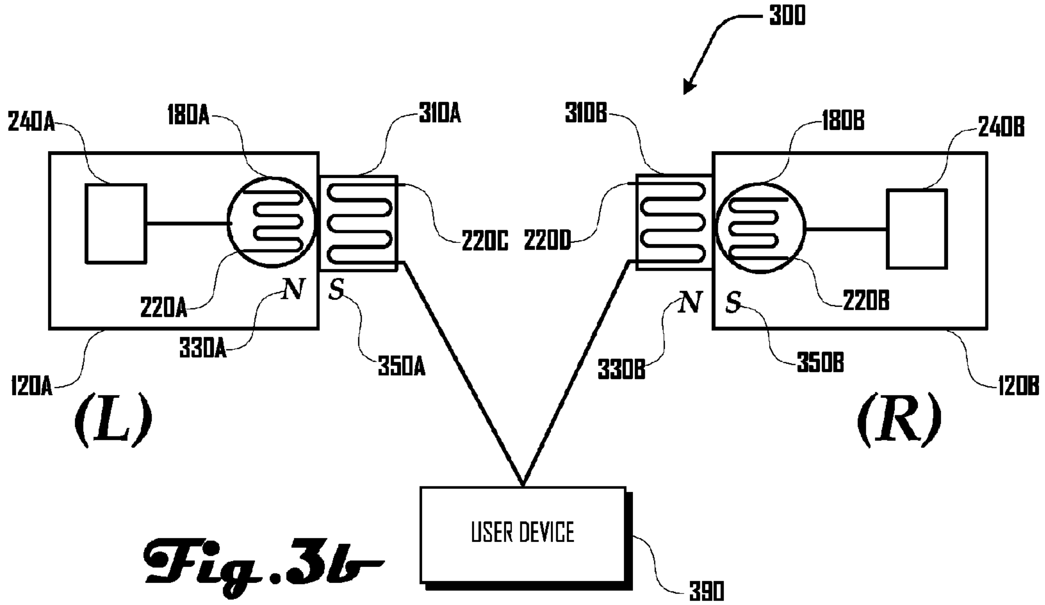
FIG. 3*b* is an earpiece coupling system in accordance with an embodiment.

FIGS. 3*a* and 3*b* depict an earpiece coupling system 300 in accordance with various embodiments. The earpiece coupling system 300 comprises a first and second earpiece body 120A, 120B and a user device 390, which is operably connected to a first and second magnetized inductive coupler 310A, 310B.

The first and second earpiece body 120A, 120B may each comprise a first and second magnetized assembly 180A, 180B, which is operably coupled to a first and second earpiece controller 240A, 240B. Additionally, the magnetized assembly 180A, 180B may comprise a first and second coil 220A, 220B, which is operable to facilitate an inductive data connection. Additionally, the first and second magnetized inductive coupler 310A, 310B may comprise a third and fourth coil 220C, 220D, which are operable to facilitate an inductive data connection.

Magnets or magnetized portions of various embodiments may include various types of magnets and may be made of various materials, which may include magnetite, lodestone, cobalt, nickel, gadolinium, dysprosium, a sintered composite, an alnico magnet, a ticonal magnet, neodymium magnet, and the like.

In various embodiments, such an inductive data connection system 300 allows inductive connectors (such as the first and second magnetized assembly 180A, 180B and the first and second magnetized inductive coupler 310A, 310B) to be electrically coupled without having to mechanically align the same. As shown in FIGS. 3*a* and 3*b*, the first magnetized assembly 180A may be coupled to the first magnetized inductive coupler 310A and the second magnetized assembly 180B may be coupled to the second magnetized inductive coupler 310A. For example, coil 220C transmits power signals and/or digital signals to coil 220A. The total power induced onto coil 220A may be a function of the distance between coils 220C, 220A. For example, the farther apart the coils 220A, 220C are, the less power would be transmitted to coil 220A. In some embodiments, electrical power may be transmitted, which may facilitate charging a battery or other power supply.

In some embodiments, to regulate level of power that is received by coil 220A, the system 300 may have a feedback circuit that varies the output of power on coil 220C as a function of the voltage induced onto coil 220A. For example, where the magnetized assembly 180A and magnetized inductive coupler 310A are spaced apart beyond a predetermined distance, the feedback system increases the power on coil 220C. Envisioned in various embodiments are circuits that may provide feedback circuits for a magnetized assembly 180A, 180B or magnetized inductive coupler 310A, 301B that transmit power or digital signals.

In various embodiments a magnetized assembly 180 and magnetized inductive coupler 310 need not be in physical contact to send, receive or otherwise obtain power or digital signals. For example, a magnetized assembly 180 may be enclosed within an earpiece body 120 such that physical contact is not possible. However, a magnetized assembly 180 and magnetized inductive coupler 310 may have opposing magnetic poles 330, 350 such that a magnetic force 370 attracts the magnetized assembly 180 and magnetized inductive coupler 310.

In various embodiments, a magnetized assembly 180 and magnetized inductive coupler 310 may be held within proximity to each other via a magnetic force 370. For example a magnetized inductive coupler 310 may be coupled to a portion of an earpiece body 120 via magnetic force 370. Additionally in further embodiments, a magnetized assembly 180, magnetized inductive coupler 310, or earpiece body 120 may comprise various structures to facilitate coupling via magnetic force 370.

In some embodiments, magnetized inductive couplers 310A, 310B may have opposing magnetic coupling poles 350, 330, and magnetized portions 180A, 180B would have complementary reversed opposing magnetic coupling poles 350, 330. Such a configuration may be desirable in various embodiments because a given magnetized inductive coupler 310 will be attracted to, and thereby couple to one of a pair of earpiece bodies 120, but not the other. Selective coupling may be desirable because a first and second earpiece body 120A, 120B may be specifically configured for a left or right ear, and selective programming or audio configuration of a left and right earpiece body 120A 120B may be necessary based on the physiological differences in a user's left and right ear or based on audio preferences of a user. The N and S magnetic orientations shown in FIGS. 3*a* and 3*b* are one embodiment; however, other orientations are contemplated in other embodiments.

For example, as shown in FIGS. 3*a* and 3*b*, the first earpiece body 120A may be configured for a user's left ear and the magnetized assembly 180A of the first earpiece body 120A may have a northern magnetic coupling pole 330A. The first magnetized inductive coupler 310A may have a southern magnetic coupling pole 350A. Accordingly, the northern magnetic coupling pole 330A and southern magnetic coupling pole 350A will experience an attractive magnetic force 370A, when in proximity, which may facilitate coupling of the first earpiece body 120A the first magnetized inductive coupler 310A.

Similarly, the second earpiece body 120B may be configured for a user's right ear and the magnetized assembly 180B of the second earpiece body 120B may have a southern magnetic coupling pole 350B. The second magnetized inductive coupler 310B may have a northern magnetic coupling pole 330B. Accordingly, the northern magnetic coupling pole 330B and southern magnetic coupling pole 350B will experience an attractive magnetic force 370B, when in proximity, which may facilitate coupling of the second earpiece body 120B the second magnetized inductive coupler 310B.

Additionally, while attractive magnetic forces 370 may be experienced between opposing magnetic coupling poles 330, 350, like magnetic coupling poles 330, 350 will experience repulsive magnetic forces (not shown). For example, the first magnetized inductive coupler 310A would not be attracted to the second magnetized assembly 180B of the second earpiece body 120B because the southern magnetic coupling poles 350A, 350B would repulse each other. Therefore, coupling may be prevented.

Similarly, the second magnetized inductive coupler 310B would not be attracted to the first magnetized assembly 180A of the first earpiece body 120A because the northern magnetic coupling poles 330A, 330B would repulse each other.

In various embodiments, it may be desirable for the first and second magnetized inductive couplers 310A, 310B to magnetically couple (while not being worn) for purposes of storage, transportation, and the like. Such coupling may be achieved via attraction of the opposing magnetic coupling poles 350A, 330B of the first and second magnetized inductive coupler 310A, 310B respectively.

In further embodiments it may be desirable for the first and second earpiece body 120A, 120B to magnetically couple (while not being worn) for purposes of storage, transportation, and the like. Such coupling may be achieved via attraction of the opposing magnetic coupling poles 350B, 330A of the first and second magnetic portion 180A, 180B. In some embodiments, the first and second earpiece body 120A, 120B or first and second magnetic portion 180A, 180B may couple to a carrying case or apparatus.

Additionally, as depicted in FIGS. 3*a* and 3*b* the first and second magnetized inductive coupler 310A, 310B may be operably connected to a user device 390. In various embodiments, the user device 390 may be various devices, such as a computing device, personal data assistant, gaming device, cellular telephone, laptop computer, and the like. In some embodiments, the first and second magnetized inductive coupler 310A, 310B may be operable to be connected to various devices, which may include a user device 390.

In some embodiments, the user device 390 may be operable to configure or program the first and second earpiece body 120A, 120B, or configure, interact with, communicate with, or program components or elements of the first and second earpiece body 120A, 120B. In further embodiments, there may be three or more magnetized inductive couplers 310.

Figure 4:
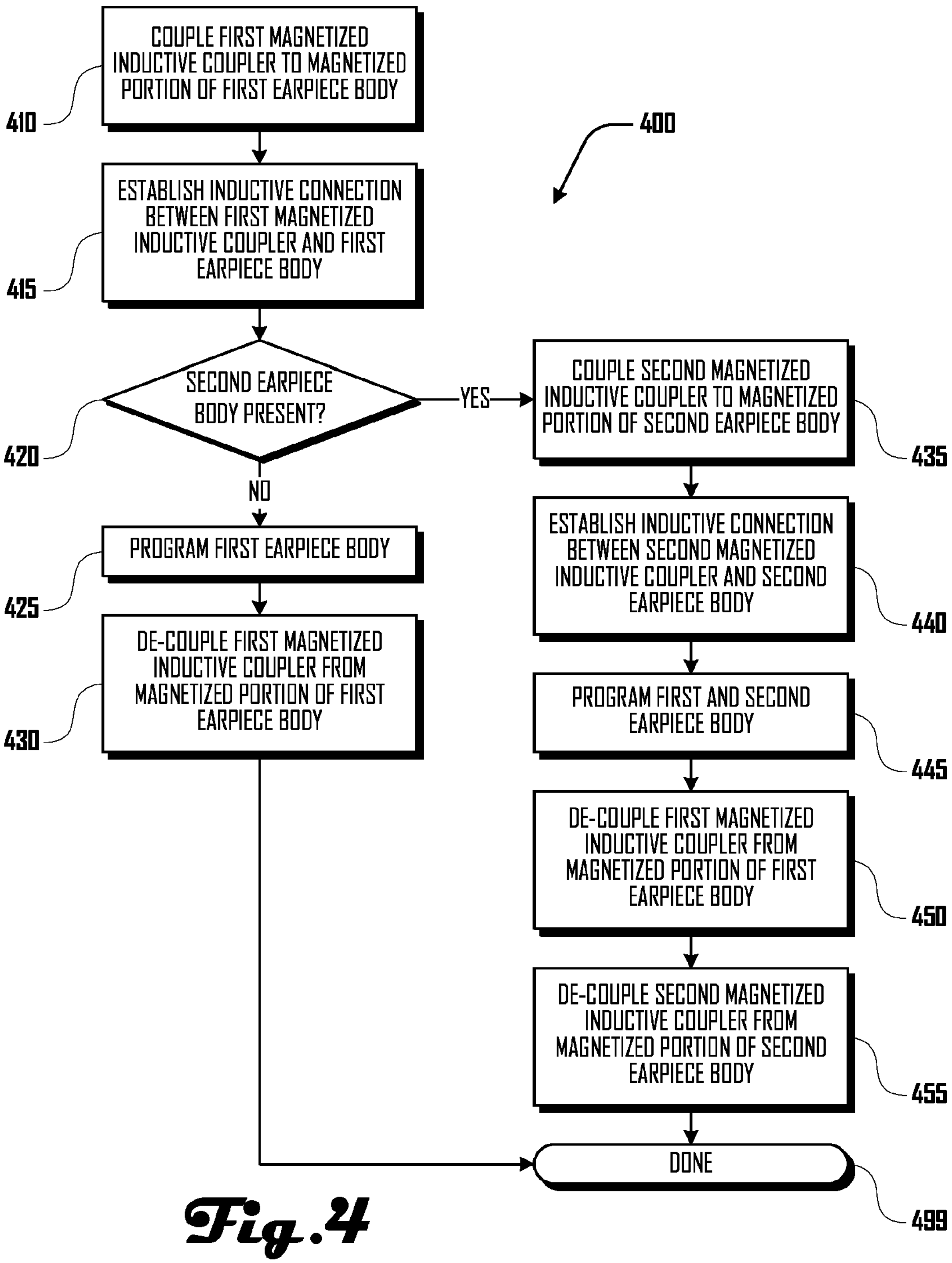
FIG. 4 is a method of earpiece programming in accordance with an embodiment.

FIG. 4 is an earpiece programming method 400 in accordance with an embodiment. The earpiece programming method 400 begins in block 410 where a first magnetized inductive coupler 310A is coupled to a magnetized assembly 180A of a first earpiece body 120A. In block 415, an inductive connection is established between the first magnetized inductive coupler 310A and the first earpiece body 120A.

In decision block 420, a determination is made whether a second earpiece body 120B is present. If a second earpiece body 120B is present, the earpiece programming method 400 continues to block 435 where a second magnetized inductive coupler 310B is coupled to a magnetized assembly 180B of the second earpiece body 120B. In block 440, an inductive connection is established between the second magnetized inductive coupler 310B and the second earpiece body 120B.

In block 445 the first and second earpiece body 120A, 120B are programmed and the earpiece programming method 400 continues to block 450 where the first magnetized inductive coupler 310A is de-coupled from the magnetized assembly 180A of the first earpiece body 120A. In block 455 the second magnetized inductive coupler 310B is de-coupled from magnetized assembly 180B of the second earpiece body 120B, and the earpiece programming method 400 ends in block 499.

However, if in decision block 420 a determination is made that a second earpiece body 120B is not present, the earpiece programming method 400 continues to block 425 where the first earpiece body 120A is programmed. In block 430 the first magnetized inductive coupler 310A is de-coupled from the magnetized assembly 180A of the first earpiece body 120A. The earpiece programming method 400 ends in block 499.

Additionally, although specific embodiments have been illustrated and described herein, it will be appreciated by those of ordinary skill in the art and others, that a wide variety of alternate and/or equivalent implementations may be substituted for the specific embodiments shown and described without departing from the scope of the embodiments described herein. This application is intended to cover any adaptations or variations of the embodiments discussed herein. While various embodiments have been illustrated and described, as noted above, many changes can be made without departing from the spirit and scope of the embodiments described herein.

The invention claimed is:

1. A magnetized hearing-aid earpiece inductive coupling system comprising:

a hearing-aid earpiece comprising an earpiece controller and a magnetized assembly, said magnetized assembly including a first inductive coil, said earpiece controller controlling a plurality of adjustable settings of said hearing-aid earpiece, said earpiece controller being communicatively coupled with said first inductive coil; and a hearing-aid programming device comprising a magnetized coupler, said magnetized coupler including a second inductive coil;

wherein said magnetized assembly and said magnetized coupler are configured to hold said first and said second inductive coils in proximity to one another via an attractive magnetic force; and wherein when in said proximity, said first and said second inductive coils are configured to inductively communicatively couple said earpiece controller with said hearing-aid programming device, enabling said hearing-aid programming device to instruct said earpiece controller to adjust said plurality of adjustable settings.

2. The system of claim 1, further comprising:

a second hearing-aid earpiece enclosing at least a second earpiece controller and a second magnetized assembly, said second magnetized assembly including a third inductive coil, said second earpiece controller controlling a second plurality of adjustable settings of said second hearing-aid earpiece, said second earpiece controller being communicatively coupled with said third inductive coil; and wherein said hearing-aid programming device further comprises a second magnetized coupler, said second magnetized coupler including a fourth inductive coil;

wherein said second magnetized assembly and said second magnetized coupler are configured to hold said third and said fourth inductive coils in second proximity to one another via said attractive magnetic force;

wherein when in said second proximity, said third and said fourth inductive coils are configured to inductively communicatively couple said earpiece controller with said hearing-aid programming device, enabling said hearing-aid programming device to instruct said second earpiece controller to adjust said second plurality of adjustable settings;

wherein said magnetized coupler and said second magnetized assembly are configured to prevent inductive coupling of said second inductive coil and said third inductive coil via a repulsive magnetic force; and wherein said second magnetized coupler and said magnetized assembly are configured to prevent inductive coupling of said fourth inductive coil and said first inductive coil via said repulsive magnetic force.

3. The system of claim 2, wherein said magnetized assembly and said second magnetized assembly are configured to magnetically couple said first and said second hearing-aid earpieces for storage, when not being worn.

4. The system of claim 1, wherein said magnetized assembly and said magnetized coupler are configured such that said first and said second inductive coils are capable of being inductively coupled and un-coupled while said hearing-aid earpiece is being worn in a wearer's ear.

5. The system of claim 1, further comprising a carrying case configured to store said hearing-aid earpiece, said carrying case including a second magnetized assembly configured to hold said hearing-aid earpiece in position in said carrying case via said attractive magnetic force.

6. The system of claim 1, wherein said earpiece controller and said magnetized assembly are enclosed within said hearing-aid earpiece.

7. The system of claim 1, wherein said magnetized assembly and said magnetized coupler are not in physical contact when said first and said second inductive coils are held in proximity to one another and configured to inductively communicatively couple said earpiece controller with said hearing-aid programming device.

8. The system of claim 1, wherein said hearing-aid earpiece further comprises a battery, and wherein when in said proximity, said first and said second inductive coils are further configured to inductively transmit electrical power to said battery.

* * * * *